(12) United States Patent
Monsen (10) Patent No.: US 7,110,462 B2
(45) Date of Patent: Sep. 19, 2006

(54) MULTIPLE ACCESS SYSTEM AND METHOD FOR MULTIBEAM DIGITAL RADIO SYSTEMS

(76) Inventor: Peter Monsen, 370 Hollow View Rd., Stowe, VT (US) 05672

( * ) Notice: Subject to any disclaimer, the term of this patent is extended or adjusted under 35 U.S.C. 154(b) by 0 days.

(21) Appl. No.: 11/118,810

(22) Filed: Apr. 29, 2005

(65) Prior Publication Data

US 2005/0220057 A1    Oct. 6, 2005

Related U.S. Application Data

(63) Continuation-in-part of application No. 09/980,416, filed as application No. PCT/US00/12802 on May 11, 2000.

(60) Provisional application No. 60/141,198, filed on Jun. 25, 1999, provisional application No. 60/137,028, filed on Jun. 1, 1999.

(51) Int. Cl.
*H04K 1/10* (2006.01)
*H04Q 7/20* (2006.01)

(52) U.S. Cl. .................. 375/260; 370/329; 455/447

(58) Field of Classification Search ............ 375/260, 375/267; 370/320, 329, 330, 335–337, 341–344; 455/422.1, 436, 447, 450–455
See application file for complete search history.

(56) References Cited

U.S. PATENT DOCUMENTS

| 4,112,370 A | 9/1978 | Monsen |
| 4,328,585 A | 5/1982 | Monsen |

(Continued)

FOREIGN PATENT DOCUMENTS

EP    0 650 271 A2    4/1995

OTHER PUBLICATIONS

"An Adaptive Receiver for Digital Signalling Through Channels With Intersymbol Interference", J.G. Proaxis and J.H. Miller, IEEE Transactions on Information Theory, vol. IT-15, No. 4, Jul. 1969, pp. 484-497.

(Continued)

*Primary Examiner*—Don N. Vo
(74) *Attorney, Agent, or Firm*—Peter J. Manus; Edwards Angell Palmer & Dodge LLP (57) ABSTRACT

A multiple-access digital radio communication system and method with communication links between user terminal transmitters and a central node with a receiver system including a multibeam antenna. User terminal transmitters assigned to one beam coverage region use multiple access channels that are mutually orthogonal for transmitting digital message information that is included in a data group. Assignments are random and are changed for successive data groups. The same multiple access channels are reused in adjacent and other beam coverage regions each with an independent random assignment algorithm. Error-correction coding and interleaving are used in the user transmitter and an adaptive processor is used in the receiver. A reference sequence unique to either each user or each beam coverage region is multiplexed into user data groups for transmission. At the receiver the adaptive processor such as an equalizer or sequence estimator is used to combine multiple antenna beam signals to produce a combined signal associated with each user. The combining in the adaptive processor reduces interference from user terminal transmitters associated with different beam coverage regions but with the same multiple access channel. Deinterleaving and error-correction decoding of the combined signal are used to protect against channel assignments with larege mutual interference levels. The communication system can reuse each orthogonal multiple access channel in all of the other beams, i.e., a reuse factor of unity for each multiple access channel.

10 Claims, 4 Drawing Sheets

U.S. PATENT DOCUMENTS

| | | | |
|---|---|---|---|
| 4,365,338 | A | 12/1982 | McRae et al. |
| 4,644,562 | A | 2/1987 | Kavehrad et al. |
| 5,220,320 | A | 6/1993 | Assal et al. |
| 5,513,215 | A | 4/1996 | Marchetto |
| 5,563,610 | A | 10/1996 | Reudink |
| 5,590,399 | A | 12/1996 | Matsumoto et al. |
| 5,596,333 | A | 1/1997 | Bruckert |
| 5,619,503 | A | 4/1997 | Dent |
| 5,680,419 | A | 10/1997 | Bottomley |
| 5,736,959 | A | 4/1998 | Patterson et al. |
| 5,838,742 | A | 11/1998 | Abu-Dayya |
| 5,987,037 | A | 11/1999 | Gans |
| 6,157,811 | A | 12/2000 | Dent |
| 6,775,332 | B1 | 8/2004 | Li et al. |
| 6,882,846 | B1* | 4/2005 | O'Byrne ............... 455/447 |
| 6,985,467 | B1 | 1/2006 | Lomp et al. |
| 2002/0107024 | A1* | 8/2002 | Dev Roy ............... 455/447 |
| 2003/0123425 | A1* | 7/2003 | Walton et al. ............... 370/341 |

OTHER PUBLICATIONS

"MMSE Equalization of Interference on Fading Diversity Channels", P. Monsen, IEEE Conference on Communications, Conference Record, vol. 1, Denver, CO, Jun. 1981, pp. 12.2.1-12.2.5.

"Adaptive Equalization and Interference Cancellation for Wireless Communication Systems", B.C.W. Lo and K.B. Letaief, IEEE Transactions on Communications, vol. 47, No. 4, Apr. 1999, pp. 538-545.

"Dynamic Channel Assignment in High-Capacity Mobile Communications Systems", D.C. Cox and D.O. Reudink, The Bell System Technical Journal, vol. 50, No. 6, Jul.-Aug. 1971, pp. 1833-1857.

"MMSE Equalization of Interference on Fading Diversity Channels", P. Monsen, IEEE Transactions on Communications, vol. COM-32, No. 1, Jan. 1984, pp. 5-12.

"Linear Multiuser Detectors for Synchronous Code-Division Multiple-Access Channels", R. Lupas & S. Verdu, IEEE Transactions on Information Theory, vol. 35, No. 1, Jan. 1989, pp. 123-136.

"Decorrelating Decision-Feedback Multiuser Detector for Synchronous Code-Division Multiple-Access Channel", A. Duel-Hallen, IEEE Transactions on Communications, vol. 41, No. 2, Feb. 1993, pp. 285-290.

"A Family of Multiuser Decision-Feedback Detectors for Asynchronous Code-Division Multiple-Access Channels", A. Duel-Hallen, IEEE Transactions on Communications, vol. 43, No. 2/3/4, Feb./Mar./Apr. 1995, pp. 421-434.

"Information-Theoretic Considerations for Symmetric, Celllular, Multiple-Access Fading Channels—Part I", S. Shamai and A.D. Wyner, IEEE Transactions on Information Theory, vol. 43, No. 6, Nov. 1997, pp. 1877-1894.

Mobile Station-Base Station Compatibility Standard for Dual-Mode Wideband Spread Spectrum Cellular System, TIA/EIA/IS-95-A, 1992. (Abstract Only).

"Feedback Equalization for Fading Dispersive Channels", P. Monsen, IEEE Transactions on Information Theory, Jan. 1971, pp. 56-64.

Least Square Estimation With Application to Digital Signal Processing, A.A. Giordano, and F.M. Hsu, John Wiley and Sons, New York, NY, 1985, Chapter 3.3.

"Channel Equalization for Block Transmission Systems", G.K. Kaleh, IEEE Journal on Selected Areas in Communications, vol. 13, No. 1, Jan. 1995, pp. 110-121.

"Minimum Probability of Error for Asynchronous Gaussian Multiple-Access Channels", S. Verdu, IEEE Transactions on Information Theory, vol. IT-32, No. 1, Jan. 1986, pp. 85-96.

"Decision Feedback Equalization for CDMA in Indoor Wireless Communications", M. Abdulrahman, A.U.H. Sheikh, and D.D. Falconer, IEEE Journal on Selected Areas in Communications, vol. 12, No. 4, May 1994, pp. 698-706.

"Blind Adaptive Multiuser Detection", M. Honig, U. Madhow, and S. Verdu, IEEE Transactions on Information Theory, vol. 41, No. 4, Jul. 1995, pp. 944-960.

"Adaptive Receiver Structures for Asynchronous CDMA Systems", P.B. Rapajic and B.S. Vucetic, IEEE Journal of Selected Areas in Communications, vol. 12. No. 4, May 1994, pp. 685-697.

"An Algorithm For Reducing the Bandwidth and Profile of a Sparse Matrix", N.E. Gibbs, W.G. Poole, Jr., and P.K. Stockmeyer, Siam J. Numer.Anal., vol. 13, No. 2, Apr. 1976, pp. 236-250.

"Blind Multiuser Detection: A Subspace Approach", X. Wang and H.V. Poor, IEEE Transactions on Information Theory, vol. 44, No. 2, Mar. 1998, pp. 677-690.

"Performance Analysis of Minimum Variance CDMA Receivers", M.K. Tsatsanis and Z. Xu, IEEE Transactions on Signal Processing, vol. 46, No. 11, Nov. 1998, pp. 3014-3022.

"On Multipath Channel Estimation for CDMA Systems Using Multiple Sensors", C. Sengupta, J.R. Cavallaro, adn B. Aazhang, IEEE Transactions on Communications, vol. 49, No. 3, Mar. 2001, pp. 543-553.

"Adaptive Space-Time Feedforward/Feedback Detection for High Data Rate CDMA in Frequency-Selective Fading," J. Smee and S.C. Schwartz, IEEE Transactions on Communications, vol .49, No. 2, Feb. 2001, pp. 317-328.

"Tracking of Time-Varying Mobile Radio Channels—Part I: The Wiener LMS Algorithm," L. Lindborn, M. Sternad, and A. Ahlen, IEEE Transactions on Communications, vol. 49, No. 12, Dec. 2001, pp. 2207-2217.

"Block Channel Equalization in the Presence of a Cochannel Interferent Signal," A. Ginesi, G.M. Vietta, and D.D. Falconer, IEEE Journal on Selected Areas in Communications, vol. 17, No. 11, Nov. 1999, pp. 1853-1862.

* cited by examiner

MULTIPLE ACCESS SYSTEM AND METHOD FOR MULTIBEAM DIGITAL RADIO SYSTEMS

CROSS-REFERENCE TO RELATED APPLICATIONS

This application is a continuation-in-part of U.S. patent application Ser. No. 09/980,416, which is the National Stage of International PCT Application No. PCT/US00/12802 filed May 11, 2000, which in turn claims the benefit of both U.S. provisional application Ser. No. 60/137,028 filed Jun. 1, 1999 and U.S. provisional application Ser. No. 60/141,198 filed Jun. 25, 1999.

FIELD OF THE INVENTION

This invention relates generally to multiple access communication in a digital radio system, and more particularly to improvements in the multiple access communication of fixed remote user terminals and/or mobile user terminals with a central node having a multibeam antenna and associated receiver.

BACKGROUND OF THE INVENTION

Multiple access radio systems provide communication services for fixed remote user terminals and/or mobile user terminals. Examples of multiple access radio systems include land mobile radio networks, cellular mobile radio networks, and wideband radio networks between fixed subscribers and one or more central nodes, which may use a multibeam antenna for increasing system capacity and improving communications quality. The reverse link or uplink in a multiple access radio system is a communications link between a fixed remote or mobile user terminal and a central node, which can be located at either a fixed location on the Earth in a terrestrial radio system or as part of an orbiting satellite in a satellite radio system.

Digital radio systems transmit and receive digital message information, e.g., computer or Internet data. Alternatively, digital radio systems accept analog message information, e.g., voice or video data, and convert this analog information to a digital format during transmission and reception. Accordingly, a fixed remote or mobile user terminal transmits message information in a digital format using an uplink to a central node, where a multibeam antenna and associated receiver process received signals to extract user message information. In some satellite radio systems, the receiver processing is divided between a satellite repeater and a ground-based station processor.

User terminals within the same beam coverage region generally avoid mutual interference through the use of some form of multiple access scheme. Conventional multiple access radio services use Frequency Division Multiple Access (FDMA), Time Division Multiple Access (TDMA), Code Division Multiple Access (CDMA), or some combination thereof. Generally, FDMA separates users into different frequency subbands; TDMA separates users into different time intervals or slots; and, CDMA separates users by assigning different signature waveforms or spreading codes to each user. These CDMA spreading codes can be either orthogonal, i.e., there is no interference between synchronized users, or quasi-orthogonal, i.e., there is some small interference between users. FDMA and TDMA are orthogonal multiple access (OMA) schemes because with ideal frequency filters and synchronization there is no mutual interference. Another example of an OMA system is CDMA with orthogonal spreading codes. Quasi-Orthogonal Multiple Access (QOMA) systems include CDMA with quasi-orthogonal spreading codes and FDMA/TDMA with randomized frequency hopping over a channel set that is not mutually orthogonal.

In both orthogonal and quasi-orthogonal multiple access systems, the multiple access channels are usually assigned by a centralized controller. The controller may make assignments for a single central node beam coverage region or the assignments may cover the beam coverage regions of multiple central nodes. The assignments to the user terminals are normally transmitted in time division with downlink message information. After synchronization, user terminals can extract the channel assignment data from the downlink messages.

For an isolated beam, an OMA scheme generally provides a larger system capacity than a QOMA scheme. However, when other beams are taken into account, practical systems often use QOMA schemes for reducing interference between users to acceptable levels.

Interference between a user on one beam and users on other beams is normally reduced by user/beam cross-channel attenuation. However, in OMA radio systems, such cross-channel attenuation usually does not reduce interference enough to allow the reuse of the same orthogonal waveform or channel in adjacent beams. Instead, channel management is typically required for determining when a multiple access channel can be reused in another beam depending on an allowable threshold of the user/beam cross-channel attenuation. This leads to a reuse factor that is less than 1. The reuse factor of a multiple access channel is defined as the number of user terminal assignments in different beam coverage regions divided by the total number of beam coverage regions. Because the capacity of a multiple access system is proportional to the average value of the reuse factor with respect to all the multiple access channels, it is desirable to make the reuse factor for each multiple access channel as large as possible subject to interference constraints. Practical limitations on multibeam antennas typically cause the reuse factor in cellular OMA systems to vary between $1/3$ and $1/12$.

In contrast, in a QOMA radio system, e.g., the uplink of a CDMA radio system in the IS-95 standard, a random channel assignment without regard to mutual interference levels can be used. The reuse factor can be unity because the combination of user/beam cross-channel attenuation and spreading code interference protection is sufficient to keep mutual interference between users in the same and different beams to adequately small levels. However, one drawback is that a QOMA radio system generally has a theoretical capacity that is less than that of an OMA radio system.

Conventional multiple access digital radio systems provide means for error-correction coding/decoding of message information, means for interleaving/deinterleaving the message information, and a transmission format for the message information that includes reference signal sub-blocks. The reference signal is generated at both the user terminal and the central node and used by the central node receiver for obtaining channel parameters to aid in demodulating a user signal. The insertion of a known reference signal in time multiplex with the transmitted message information is described in "An Adaptive Receiver for Digital Signaling through Channels with Intersymbol Interference", J. G. Proakis and J. H. Miller, IEEE Transactions on Information Theory, vol. IT-15, No. 4, July 1969 and in U.S. Pat. No. 4,365,338. Error-correction coding adds redundancy to message information in a prescribed manner so that transmission errors may be corrected with a decoder at the receiver. The purpose of the interleaver/deinterleaver is to randomize these transmission errors at the decoder input so as to make the decoder more capable of correcting them.

Some conventional digital radio systems use adaptive equalizers for combining multipath signals and reducing intersymbol interference. Adaptive equalizers have also been proposed for use with a multibeam receiver for reducing interference from other users.

U.S. Pat. No. 5,619,503 Cellular/Satellite Communications Systems with Improved Frequency Re-Use, P. W. Dent, [hereafter Dent] describes an invention that improves the reuse factor in a managed multiple access assignment system. The re-use factor is improved by a combination of adaptive processing at the receiver and the use of managed multiple access assignments that employ mutual interference criteria. Under general conditions of random geographical user locations the re-use factor is less than unity.

*MMSE Equalization of Interference on Fading Diversity Channels*, Peter Monsen, IEEE Conference on Communications, Conference Record, Vol. 1, Denver, Colo., June 1981, pp. 12.2-1–12.2-5, describes an adaptive equalizer that combines multipath signals and reduces intersymbol and other user interference. The total interference is included in an error signal whose mean square value is minimized. Transmission of a time division multiplexed reference that is known at the receiver is also described.

U.S. Pat. Nos. 4,112,370 and 4,644,562 disclose the cancellation of interference in multibeam antennas as a generalization of the cancellation of interference in dual-polarized antennas.

U.S. Pat. No. 5,680,419 discloses adaptive sequence estimation techniques that can be used with a multibeam antenna for canceling interference. *Adaptive Equalization and Interference Cancellation for Wireless Communication Systems*, B. C. W. Lo and K. B. Letaief, IEEE Trans. Comm., vol. 47, no. 4, April 1999, pp. 538–545 discloses in a multiantenna application a maximum likelihood sequence estimation technique that uses a reference signal of the desired user in order to detect a user signal in the presence of intersymbol interference and other user interference. Although either an equalizer or a sequence estimator or a combination of both can be used for adaptive processing, the equalizer is generally preferred because it is not as complex as the sequence estimator.

Other relevant patent documents and publications include U.S. Pat. No. 5,838,742, Dynamic Channel Assignment in High-Capacity Mobile Communications Systems, D. C. Cox and D. O. Reudick, Bell System. Tech. Journal, vol. 51, pp. 1833–2857, July–August 1971; *MMSE Equalization on Fading Diversity Channels*, P. Monsen, IEEE Transactions on Communications, vol. COM-32, No. 1, pp. 5–12, January 1984; *Linear Multiuser Detectors for Synchronous Code-Division Multiple Access Channels*, R. Lupas and S. Verdu, IEEE Transactions on Information Theory, vol. IT-35, No. 1, pp. 123–136, January 1989: *Decorrelating Decision-Feedback Multiuser Detector for Synchronous Code-Division Multiple Access Channels*, A. Duel-Hallen, IEEE Transactions on Communications, vol. COM-41, No. 2, pp. 285–290, February 1993; *A Family of Multiuser Decision Feedback Detectors for Asynchronous Code-Division Multiple Access Channels*, A. Duel-Hallen, IEEE Transactions on Communications, vol. COM-43, Nos. 2,3,4, February–April 1995; *Information-Theoretic Considerations for Symmetric, Cellular, Multiple Access Fading Channels-Part I*, S. Shamai and A. D. Wyner, IEEE Transactions on Information Theory, vol. 43, No. 6, pp 1877–1894, November 1997; and, *Mobile Station-Base Station Compatibility Standard for Dual-Mode Wideband Spread Spectrum Cellular System*, EIA/TIA IS-95, 1992.

Although the techniques described above have been used for improving communications quality and increasing the capacity of multiple access communication systems, it has been recognized that the capacity of OMA systems is limited because its multiple access channels have reuse factors less than 1. It has also been recognized that the capacity of QOMA systems is limited because its theoretical capacity is less than that of a corresponding OMA system.

SUMMARY OF THE INVENTION

With the foregoing background in mind, it is an object of the invention to provide a multiple access communication system and method with increased channel capacity and improved communications quality.

Another object of the invention is to provide a multiple access communication system and method that is orthogonal in each beam coverage region and has a channel capacity greater than that of conventional quasi-orthogonal multiple access communication systems.

Still another object of the invention is to provide an orthogonal multiple access communication system and method that has random channel assignments and a reuse factor of unity.

The foregoing and other objects are achieved in a multiple access communication system including a plurality of user terminals, each including a user terminal transmitter; and a central node including a multibeam antenna and associated receiver for receiving digital message information transmitted by the user terminal transmitters. The receiver includes a multibeam antenna that receives multiple access signals from the user terminal transmitters. The multibeam antenna produces beam coverage regions in which user terminals are located. User terminal transmitters are associated with a beam coverage region, and those user terminal transmitters associated with a beam coverage region employ mutually orthogonal multiple access waveforms. Assignments of user terminal transmitters to multiple access waveforms are accomplished with a random assignment algorithm that requires no evaluation of mutual interference characteristics. User transmitter terminals associated with other beam coverage regions an reuse the same orthogonal waveforms from the mutually orthogonal waveform set.

In a preferred embodiment, the user terminal transmitter includes a coding unit for providing error-correction coding of the digital message information, an interleaving unit for distributing the error-correction coded message information, a multiplexer for multiplexing user reference signals with the error-correction coded message information, and a modulator for modulating the multiplexed signal for subsequent transmission as a respective multiple access signal, wherein each of the respective multiple access signals associated with a beam coverage region employ an orthogonal waveform from a mutually orthogonal waveform set. The assignment algorithm uses a different random assignment for each group or packet of multiplexed data. In an FDMA/TDMA system the assignment algorithm produces time/frequency hopped user assignments so that within a cellular region no two users simultaneously share the same channel but the same channels are reused in adjacent cells. Random assignments, for example, can be accomplished by using either a random number generator or by using a pseudo-noise generator.

In this preferred embodiment at the central node, a receiver includes a multibeam antenna for receiving respective multiple access signals from the user terminal transmitters, an adaptive processor for each user that processes the received beam signals and the reference signals to combine the received beam signals and reduce other user interference, and a deinterleaver and decoder for each user to recover the digital message information from the combined signal.

The error-correction coded information is interleaved before transmission so that after deinterleaving at the receiver, the other user interference of successive error-correction coded symbols is different. The interleaving thus improves the error-correcting capability of the decoder and allows unity re-use for arbitrary geographic location of user transmitter terminals. In general every user employs a unique reference signal so that the receiver can extract channel information for that user by generating a replica of the unique reference signal and processing it with the received antenna beam signals. Since users within the same beam coverage region are assigned channels from a mutually orthogonal set, these users may employ the same reference signal. At the receiver there is an adaptive processor for each user and this adaptive subsystem processes the antenna beam signals that contain significant adjacent beam interference. In the preferred embodiment the adaptive processor is a multibeam equalizer that minimizes a mean square error by means of an estimated gradient algorithm. The error contains all the channel effects including additive noise, other user interference, and multipath reflection effects. In this preferred embodiment only the user reference signal for the desired user is required in the estimated gradient algorithm. In an alternative embodiment the adaptive processor solves a set of simultaneous equations for each received data group. The solution of these equations provides the processor settings for that received group. The user reference signal for a respective beam coverage region and user reference signals corresponding to interfering beams are employed to determine the adaptive processor parameter settings in this alternative embodiment.

Still further objects and advantages will become apparent from a consideration of the ensuing description and drawings.

BRIEF DESCRIPTION OF THE DRAWINGS

The invention will be better understood by reference to the following more detailed description and accompanying drawings in which.

DETAILED DESCRIPTION OF THE INVENTION

Figure 1:
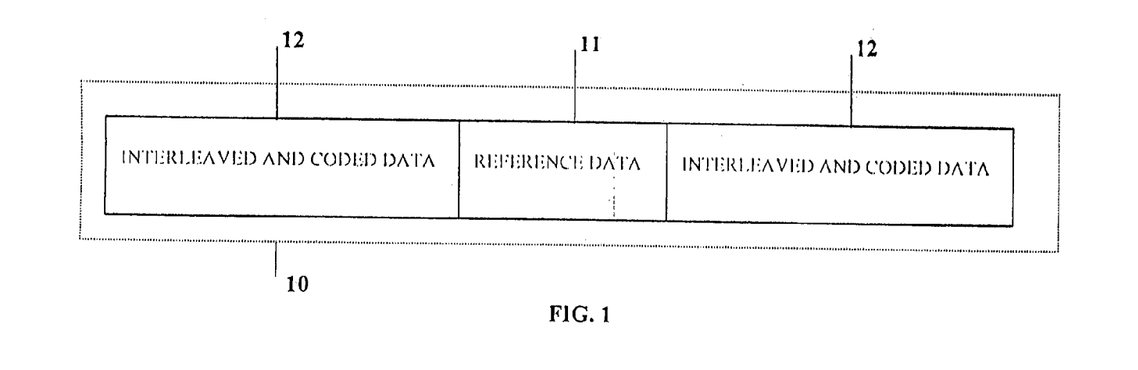
FIG. 1 is a diagram of a packet for transmission in the communication system of the present invention.

FIG. 1 shows the transmission format for a packet 10 of user message information to be sent over a reverse link or an uplink in a multiple access radio system between a fixed remote user terminal or a mobile user terminal and a central node, which may be located at either a fixed location on the Earth in a terrestrial radio system or as part of an orbiting satellite in a satellite radio system.

Data group 10 includes a user reference signal that is a block of reference data 11, which is inserted into the data group 10 at the user terminal. In particular, the reference data 11 includes a sequence of known data symbols (not shown) that may be inserted into the data group 10 either as a contiguous block as depicted in FIG. 1 or in some distributed manner. The sequence of data symbols and the manner in which they are inserted into the data group 10 are known at the central node for each user in the multiple access radio system whose message information is to be processed at that node. Further, the reference data 11 is used for determining adaptive processor parameter settings at the central node, as described in further detail below.

The data group 10 also includes interleaved and coded data 12, which is representative of processed user message information in digital form. Finally, the data group 10 may include other system or user information (not shown) in addition to the reference data 11 and the interleaved and coded data 12.

Figure 2:
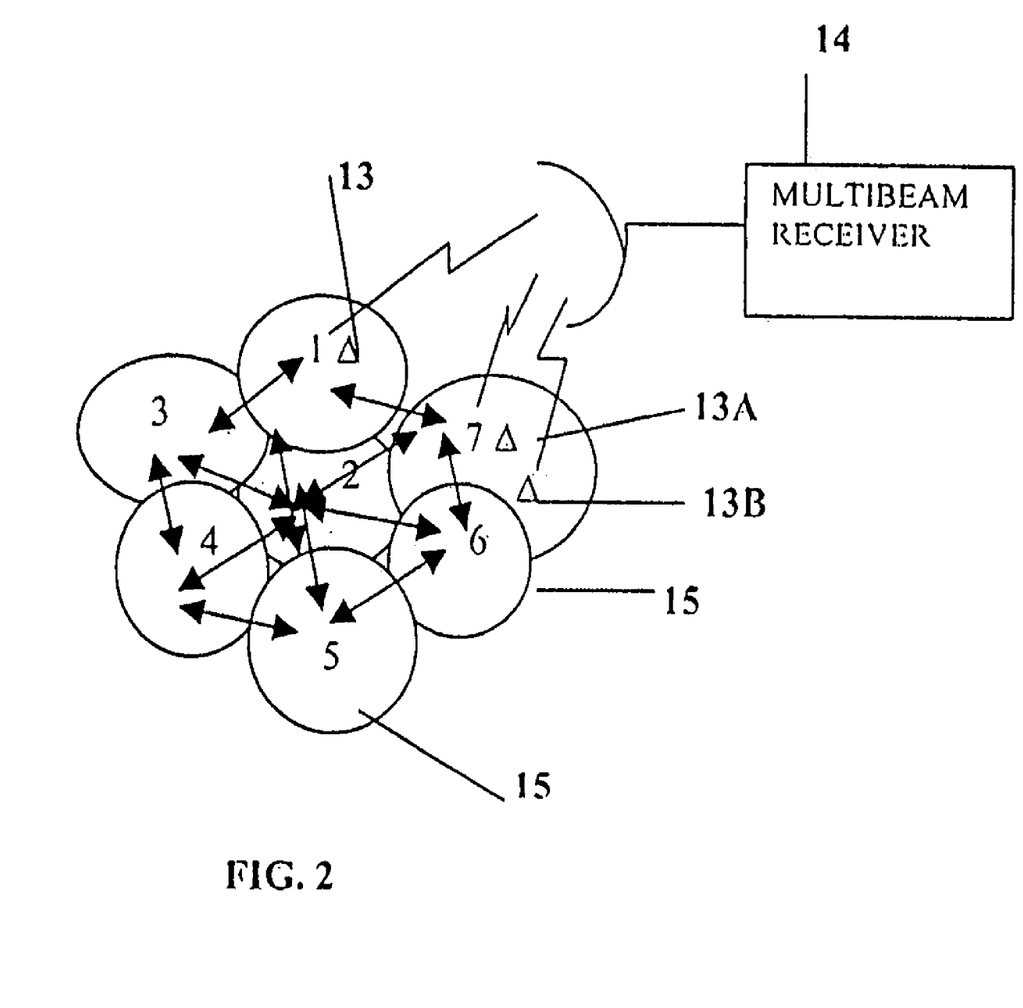
FIG. 2 is a diagram of beam coverage regions containing user terminal transmitters that transmit information to a receiver in the present invention.

As shown in FIG. 2 the multiple access radio system according to the present invention includes user terminal transmitters 13 that are included in user terminals and that have associated digital radio communication links, i.e., reverse links or uplinks, to a receiver 14 at the central node. The receiver 14 includes a multibeam antenna that produces beam coverage regions 15 that are numbered 1–7 in this example. Further, user terminal transmitters 13 are associated with beam coverage regions 15. The beam coverage regions typically overlap because antenna beams do not have ideal cutoff transitions. A user terminal transmitter 13 is usually assigned to a user terminal beam coverage region 15 depending on geographic location and antenna beam response characteristics. Typical user/beam cross-channel interference between uplink transmissions as a result of overlap of the antenna beam patterns occurs in adjacent beam coverage regions. This adjacent beam interference is illustrated in FIG. 2 for a satellite application by dark arrows between the beam coverage region pairs 1-2, 1-3, 1-7, 2-3, 2-4, 2-5, 2-6, 2-7, 3-4, 4-5, 5-6, and 6-7. In a terrestrial system, a central node may provide coverage to N sectors where each sector corresponds to a 360°/N arc from the central node center. In a typical terrestrial application N=3.

User terminal transmitters 13 associated with the same beam coverage region 15 are assigned orthogonal multiple access (OMA) channels from a mutually orthogonal set. Examples of OMA schemes that may be used with the multiple access radio system of the present invention include Frequency-Division Multiple Access (FDMA), Time-Division Multiple Access (TDMA), and Orthogonal-Waveform Code-Division Multiple Access (OCDMA), and various combinations thereof. In the present invention the same multiple access channel is reassigned in all other beam coverage regions for a reuse factor of unity. A number of mutually orthogonal channels available for assignment to a central node with multibeam antennas depend on the number of adjacent central nodes that also produce multiple access interference in an orthogonal assignment system. For example in terrestrial systems, if each node produces three 120° sector regions and the central nodes are located so as to produce six adjacent central nodes around each central node, there are a total of 3×7=21 cellular regions. In this multiple central node example, a conventional assignment algorithm would be to assign ½₁ of the available mutually orthogonal channels to each cellular region, i.e., a reuse factor of ⅓ for each central node. In the proposed invention the reuse factor for each central node is unity. Because of the random assignments, error correction coding, interleaving, and adaptive processing at the receiver, the global reuse factor for a group of central nodes can be significantly higher than ⅓.

The assignment of channels to the user terminal transmitter 13 can be accomplished by transmitting assignment data to the user terminal from either the central node or a centralized location that includes multiple central nodes. Assignment data may be time division multiplexed with downlink message transfers or transmitted on a separate channel to the user terminal.

The selection of a multiple access channel for a user terminal in a beam coverage region 15 is random within the group of unused channels in that region selected from the mutually orthogonal set. Random assignments, for example, can be accomplished by using either a random number generator or by using a pseudo-noise generator. Successive data groups receive new random assignments. Within a cellular region the set of multiple access channels from which the assignments are made are orthogonal. The assignments in different cellular regions use different random selections from the same mutually-orthogonal set. In an FDMA/TDMA system, for example, the assignments may be for a fixed time slot but frequency hopped over the set of frequency channels or the assignments may be both time and frequency hopped. Because hopped channel assignments are orthogonal within the beam coverage region 15 there is ideally only mutual interference between users in different cells that are instantaneously assigned the same multiple access channel. Random hopping assignments will produce a random adjacent cell interference which depending on user geographic location could be severe. The present invention overcomes the varying mutual interference with error-correction coding, interleaving, and adaptive processing resulting in unity reuse of multiple access channels. This is in contrast to managed assignment schemes where the assignments are made on the basis of mutual interference constraints and reuse factors are generally less than unity.

With the present invention, two users can be at virtually the same geographical location in two different cellular regions. Even though their respective mutual interference is unity, they are only assigned the same multiple access channel infrequently due to the random assignments. At the receiver the subsequent deinterleaving and error correction decoding can overcome infrequent same channel assignment events. When the user locations in two different cellular regions are close but not identical, the adaptive processor also contributes to the reduction of mutual interference for same channel assignment events. Thus for the general condition of random geographical location of users within a cellular region, the present invention achieves a reuse of all available orthogonal multiple access channels, i.e. a reuse factor of unity.

Figure 3:
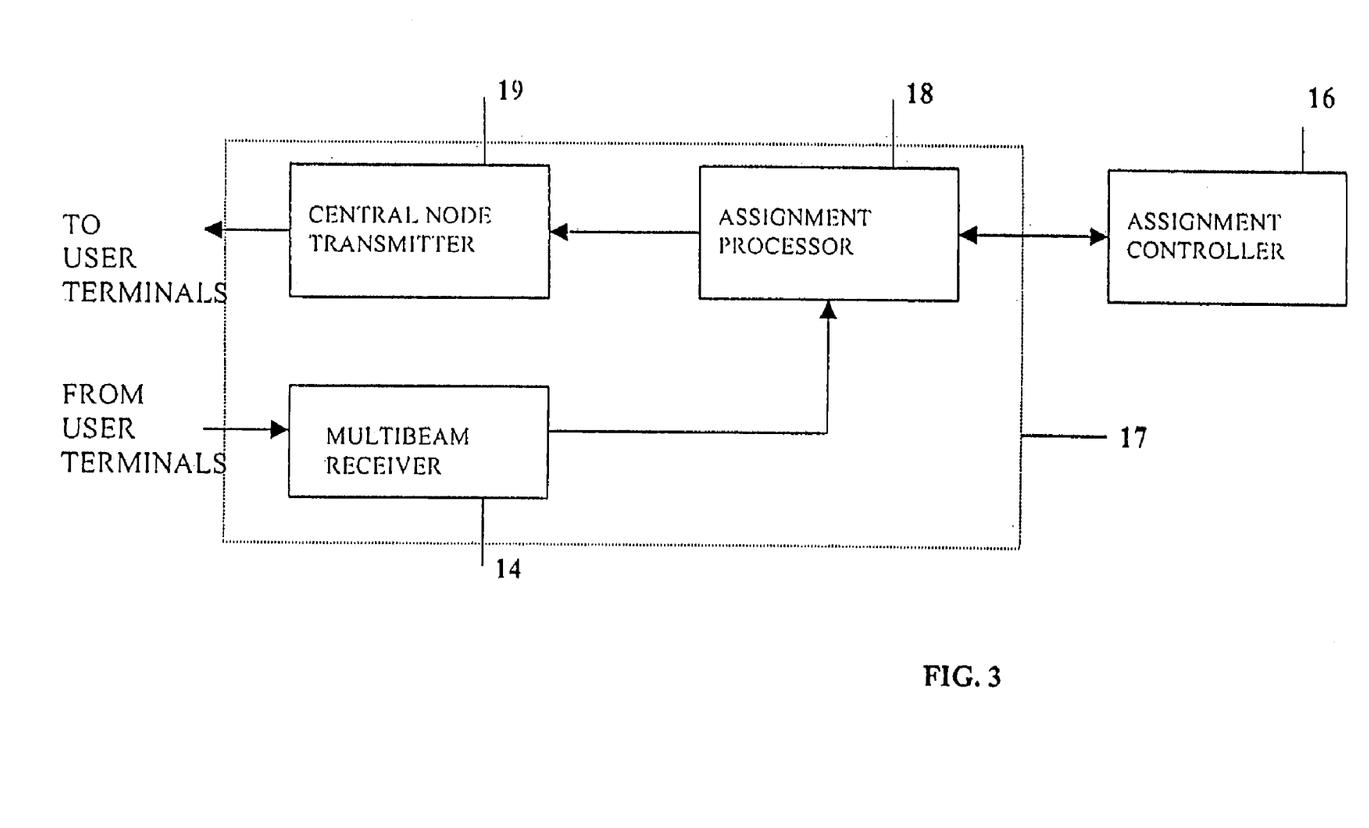
FIG. 3 is a functional block diagram of a central node connected to an assignment controller in the present invention.

In order to overcome occasional severe mutual interference events, the number of data groups interleaved must be significantly greater than unity. Simulations show that values of four to eight for the number of interleaved data groups provide unity reuse with good bit error rate performance. With reference to FIG. 3, in the preferred embodiment the multiple access channel assignments are produced by an assignment controller 16 that is either collocated with the central node 17 or is connected to the central node 17 with a communication link (indicated as a double-arrow line in FIG. 3) to transfer assignment data to an assignment processor 18. The assignment processor 18 formats assignment data for downlink transfer to user terminals via a central node transmitter 19 and it receives status information from the receiver 14 to be described subsequentlythat recovers uplink message information. This status information is passed on to the assignment controller 16 by the assignment processor 18.

Each user terminal transmitter 13 associated with a particular beam coverage region is assigned a multiple access channels from a mutually orthogonal set. Thus user terminal transmitters 13A and 13B associated with the same beam coverage region do not interfere with each other under ideal transmission conditions. The user terminals 13 and 13 A (or 13 and 13B) shown in beam coverage regions numbered 1 and 7, respectively, may be assigned the same multiple access channel by the assignment controller 16 and thus would interfere with each other under ideal transmission conditions. For nonideal transmission conditions such as multipath reflections there can be both intrabeam and interbeam interference that is compensated for by the adaptive processor in the receiver 14. Because of adjacent beam interference the interbeam interference is typically more severe in multipath environments of an OMA system because there is no orthogonal channel protection.

Figure 4:
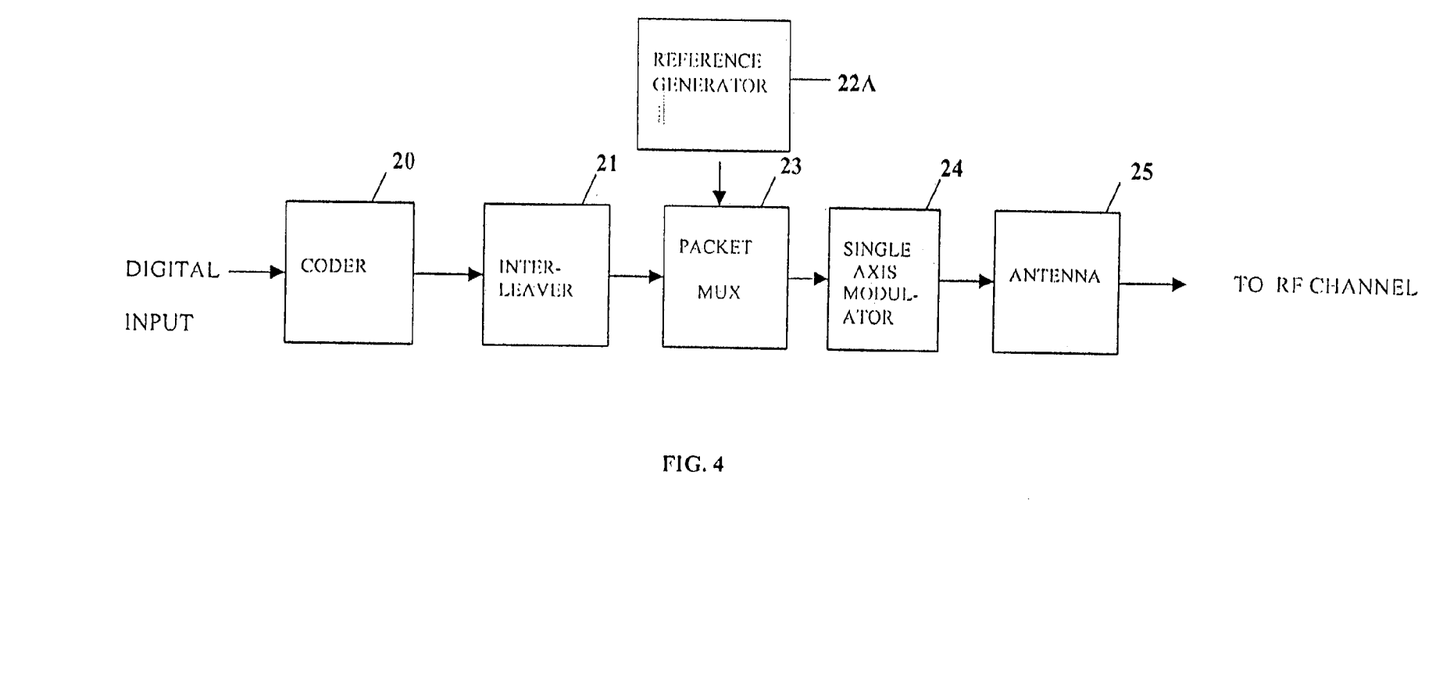
FIG. 4 is a functional block diagram of a user terminal transmitter in the communication system of the present invention.
Figure 5:
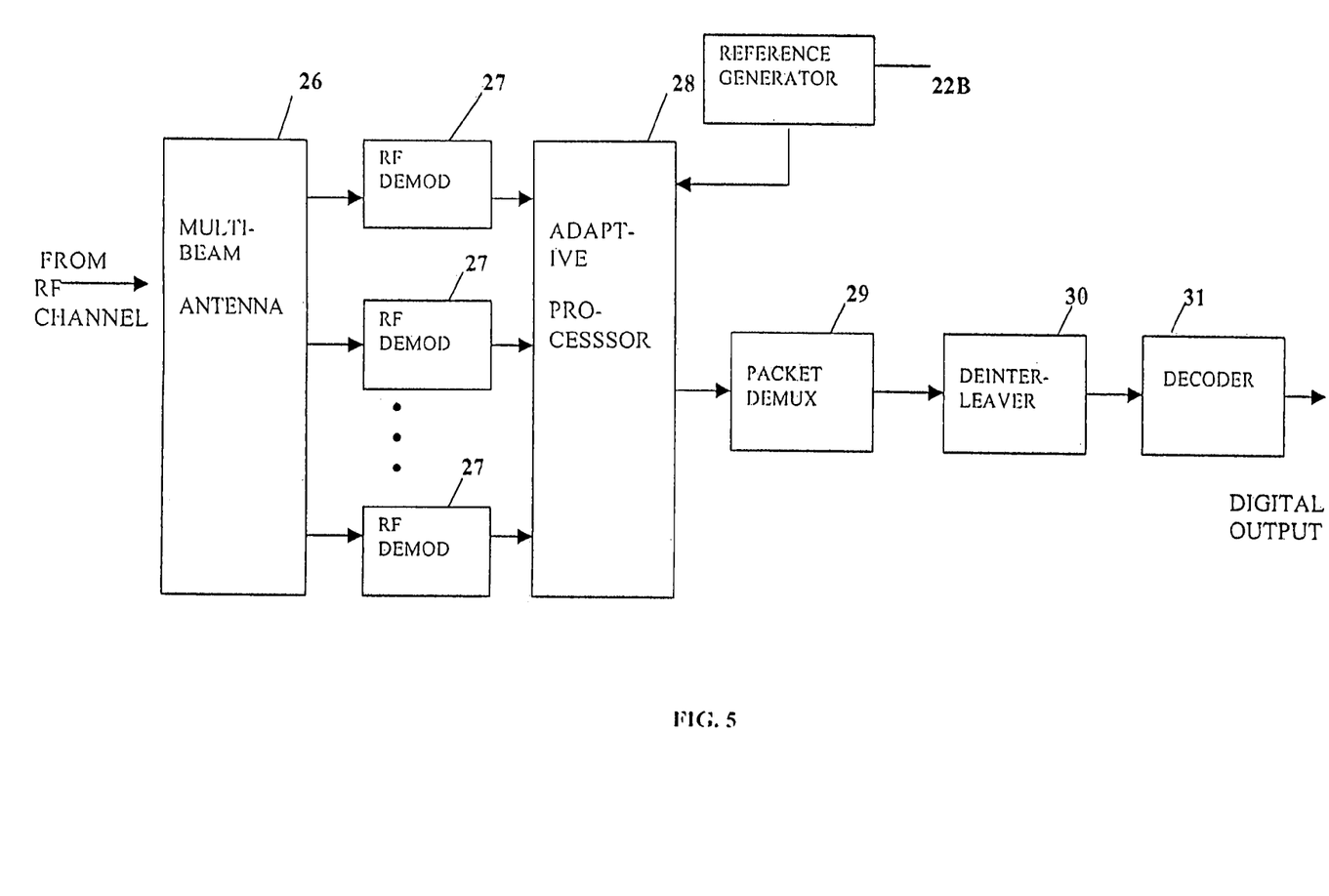
FIG. 5 is a functional block diagram of a receiver at a central node in the present invention.

Before describing in detail a user terminal transmitter 13 and a receiver 14 in accordance with the present invention, it should be understood that the present invention includes conventional communication system components, e.g., error-correction coder/decoder, interleaver/deinterleaver, multiplexer/demultiplexer, modulator/demodulator, and adaptive processor, which perform tasks related to the transmission and/or reception of user message information. Because these communication system components are conventional and known to those skilled in this art, the user terminal transmitter 13 and the receiver 14 have been described through the use of functional block diagrams, wherein each block is representative of one of these conventional communication system components. For the adaptive processor, a preferred and alternative construction is identified below.

FIG. 4 shows a preferred embodiment of a user terminal transmitter 13 according to the present invention. User message information to be transmitted on an uplink to a receiver 14 may initially be in either analog or digital form. However, the user message information is preferably converted, if necessary, into digital form before being provided as a digital input to a coder 20, which adds redundancy in the form of an error-correction code, thereby causing the digital transmission rate of coded data at the output of the coder 20 to be greater than the digital input rate at the input of the coder 20. It should be noted that the type, the subclass, and the parameters related to the error-correction code are not critical to the present invention. In a binary communication system an example of an error-correction coding technique would be the rate ½, constraint length 7, convolutional code with generators 133,171.

The coder 20 provides the coded data to an interleaver 21, which distributes the coded data among multiple data groups in a predetermined manner. In a preferred embodiment, the coded data is distributed among the multiple data groups as follows. If there are N symbols per data group, then the N symbols are evenly distributed over N data groups; e.g., symbol 1 goes in data group 1, symbol 2 goes in data group 2, and so on, until symbol N goes in data group N, and then the process is repeated until all N data groups are full. However, it should be understood that the interleaver 21 may distribute the coded data into the multiple data groups in other ways and still achieve a reuse factor of 1 in the uplink of the OMA system.

A reference generator 22A locally produces the sequence of known data symbols included in the reference data 11 mentioned above, and then provides the reference data 11 to a data group multiplexer 23. The block of reference data 11 that is inserted into data group 10 can be unique to each user or it may be the same for each user in a beam coverage region 15 but unique relative to users in other beam coverage regions 15 in the multiple access radio system. Similarly, the interleaver 21 provides the interleaved and coded data 12 to the data group multiplexer 23, which then generates data groups having the general form shown in FIG. 1. As also mentioned above, each data group may include other system or user information in addition to the reference data 11 provided by the reference generator 22A and the interleaved and coded data 12 provided by the interleaver 21.

Next, the data group multiplexer 23 sequentially provides the generated data groups to a modulator 24, which converts the packetized data to a multiple access signal suitable for transmission over an uplink to a receiver 14 using a radio frequency (RF) channel.

Finally, the modulator 24 provides the multiple access signal to an antenna 25 for transmission over an uplink to a receiver 14 using an RF channel.

FIG. 5 shows a preferred embodiment of a receiver 14 according to the present invention. The receiver 14 includes a multibeam antenna 26, which receives the multiple access signals produced by the modulator 24 in each user terminal transmitter and transmitted over the RF channel. The multibeam antenna 26 receives multiple access signals on a plurality of beams, each beam including a set of users assigned to respective OMA channels. The same orthogonal channel may be reused in different beams because of the random-like nature of the mutual interference and the interference protection provided by the combination of error-correction coding/decoding, interleaving/deinterleaving, and adaptive processor combining so that a reuse factor of unity is achieved. The output of the multibeam antenna 26 is a set of multibeam antenna signals.

If the multibeam antenna has B beams and B antenna beam signals, then for a particular user there are M antenna beam signals that contain users with significant interference, wherein $M \leq B$. The choice of M is dependent upon the required communications quality and the required complexity of the receiver 14. Accordingly, the multibeam antenna 26 provides the B antenna beam signals to B RF demodulators 27.

For the particular user mentioned above, a subset of the RF demodulators 27 provide M demodulated signals to an M-dimensional adaptive processor 28 for beam combining and other user interference reduction. In a preferred embodiment, the subset of the RF demodulators 27 converts the antenna beam signals provided by the multibeam antenna 26 from the RF channel to digital form at baseband for subsequent processing by the adaptive processor 28.

The adaptive processor 28 processes multiple demodulated signals and possibly previously detected digital symbols from the particular user and the other users, thereby generating a combined signal with reduced interference from the other users. The adaptive processor 28 may take the form of an adaptive equalizer that minimizes some error criterion, or an adaptive sequence estimator that finds the most likely transmitted digital symbol sequence for the particular user, or some combination of both. Examples of adaptive equalizers that might be used in this multibeam application include linear minimum mean square error (MMSE) receivers, decorrelation detectors, and decision-feedback detectors. The preferred embodiment of an adaptive equalizer is described in "*MMSE Equalization of Interference on Fading Diversity Channels*", P. Monsen, IEEE Transactions on Communications, vol. 32, no. 1, January 1984 [hereafter denoted by *MMSE Equalization*], the disclosure of which is hereby incorporated by reference. An example of adaptive sequence estimation in this multibeam application is described in *Adaptive Equalization and Interference Cancellation for Wireless Communication Systems*, B. C. W. Lo and K. B. Letaief, IEEE Trans. Comm., vol. 47, no. 4, April 1999, pp. 538–545, the disclosure of which is hereby incorporated by reference.

In the preferred embodiment the adaptive processor 28 is adapted by using a replica of the reference data for a particular user. To this end, the reference generator 22B provides a user-identifying replica of the reference signal for a particular user, e.g., reference data 11, to the adaptive processor 28. The adaptive processor 28 exploits the user-identifying replica to adapt its parameters and then generates a combined signal that corresponds to a particular user from the M antenna beam signals.

The combining in the preferred embodiment is accomplished by using the MMSE equalizer described in *MMSE Equalization*, above. The adaptation of this equalizer to minimize a mean square error containing noise and interference is accomplished with the user-identifying replica that is known to the receiver 14. As described in *MMSE Equalization*, this adaptation takes place when the reference signal is present in the received signal corresponding to a desired user. The error signal is derived from the difference between the combined signal and the user-identifying replica. The adaptation of the MMSE equalizer described in *MMSE Equalization* is accomplished in the preferred embodiment with the Least-Mean-Squares (LMS) algorithm. The LMS algorithm is a well-known estimated-gradient algorithm that has been applied in many equalizer applications. This algorithm is applied to the adaptation of a linear equalizer in "*An Adaptive Receiver for Digital Signaling through Channels with Intersymbol Interference*", J. G. Proakis and J. H. Miller, IEEE Trans. on Information Theory, vol. IT-15, No. 4, July 1969 and is applied to the adaptation of a decision-feedback equalizer in "*Feedback Equalization for Fading Dispersive Channels*", P. Monsen, IEEE Trans. on Information Theory, vol. IT-17, pp. 55–64, January 1971. In this LMS algorithm with application to the MMSE equalizer of *MMSE Equalization*, the error signal, referenced above, is multiplied by each of the M antenna beam signals and each equalizer weight is updated by a fraction of the multiplication product corresponding to its antenna beam signal. The LMS algorithm is an estimated gradient algorithm in that it searches for the optimum mean-square error solution by making steps in a multidimension space that correspond to the negative of the estimated gradient. The combined signal is then produced by multiplying the equalizer weights and antenna beam signals and by adding up the M products. Interference and noise are both reduced because the mean square value of the error signal has been minimized. This equalizer can be extended to include multipath dispersion and cancellation of previous user decisions as described in *MMSE Equalization*.

In an alternative embodiment, the combining is accomplished by using not only the replica of the reference signal of the desired user but replicas of reference signals for interfering users as well. For the desired user and each potential user interferer in M-1 other beams coverage regions, the adaptive processor 28 performs $M^2$ correlations of the user-identifying replicas from a plurality of reference generators 22B and antenna beam signals from RF demodulators 23 to obtain user/beam cross-channel values $A_{IJ}$, for user J transmitting to beam I. The values $A_{IJ}$ are in general complex. As an example of possible user/beam cross-channel interference consider FIG. 2 which shows a group of beam coverage regions 15 which contain user terminal transmitters 13 that send message information to the receiver 14. The receiver 14, as described above with reference to FIG. 5, contains, for example, a seven-beam antenna that produces the beam coverage regions 15 or cells numbered 1–7. Interference between user terminal signals is most pronounced between users in adjacent cells. Since the users in each cell are assigned multiple access channels from a mutually orthogonal set, the first order interference in the absence of multipath distortion is only from users with the same multiple access channel but located in an adjacent cell. Analysis of this type of configuration has shown that the worst interference situation occurs for a user in a ring cell, i.e., 1,3–7, rather than the center cell 2. If, for example, the receiver 14 is trying to recover the message information for a user in cell 1 then the minimum user/beam cross channel values of interest (cells 2, 3, and 7 being adjacent to cell 1) are $A_{11}, A_{12}, A_{21}, A_{13}, A_{31}, A_{17}, A_{71}$, which corresponds to M=4 in a B=7 beam system. Better interference cancellation is obtained by increasing the value $M \leq B$. For M=7 in this example the user/beam cross channel values $A_{IJ}$ for I,J= 1, . . . 7 must be computed. The additional cross channel values in the M=7 calculation increases the opportunity to cancel interference affecting the user in cell 1. For a user in the center cell (cell 2, as shown in FIG. 2), the minimum nonzero user/beam cross channel values are $A_{2J}$ and $A_{J2}$, J=1,3–7, i.e. M=6. There is more interference in the center cell user example but theoretical capacity calculations show that this interference is exploited in the invention to realize improved capacity relative to the ring cell example.

A solution for the optimum combining weights can be expressed in terms of the complex user/beam cross channel matrix $A=\{A_{IJ}, I, J=1,2, \ldots M\}$, $M \leq 7$ in this example (it is understood that the indices may have been renumbered for convenience), and an estimate of the additive channel noise power $\sigma^2$ in one quadrature axis at the multibeam antenna input. The equalizer weights are used in the combiner to form the complex inner product for the $L^{th}$ user $$s_L = \underline{w}'_L \underline{x} = \sum_{I=1}^{M} w_{LI} y_I, \quad L = 1, \ldots M \tag{1}$$

where $w_{LI}$ is the $I^{th}$ complex equalizer weight for the $L^{th}$ user, $y_I$ is the complex $I^{th}$ matched antenna beam signal, and $s_L$ is the combined signal for the $L^{th}$ user. The matched antenna beam signals are generally complex and are calculated in the matched filter operation by $$y_I = \sum_{J=1}^{M} A^*_{JI} x_J, \quad I = 1, 2, \ldots M \tag{2}$$

Direct calculation of the equalizer weight vector is accomplished by solving the set of M simultaneous equations expressed in matrix/vector form $$H \underline{w}_L = \underline{e}_L \tag{3}$$

where
H=A'A+$\sigma^2$I
$e_{LI}$=1 if L=I and 0 otherwise,
I=Identity Matrix,
$\sigma^2$=channel noise power (3)

This direct calculation solution corresponds to the Minimum Mean Square Error (MMSE) solution determined in the preferred embodiment by means of an LMS algorithm adaptation. The direct calculation solution is attractive when the number of interfering cells is not too large and multipath distortion is minimal.

The matrix H is an Hermetian matrix so that the simultaneous equations (3) can be solved by a Cholskey decomposition that is described in numerical computational texts such as "*Least Square Estimation with Application to Digital Signal Processing*" by A. A. Giordano and F. M. Hsu, John Wiley and Sons, New York, N.Y., 1985, Chapter 3.3, the disclosure of which is hereby incorporated by reference. In this decomposition method the matrix H is decomposed into G'G where G' is the transpose of G and G is a lower diagonal matrix, i.e. all the elements in the matrix above the diagonal are zero.

In the special case where the additive channel noise power $\sigma^2$ is taken as zero, this MMSE solution reduces to a solution that cancels all the interference, i.e. a zero-forcing solution. There is no zero-forcing solution when the matrix A'A is not invertible. This matrix is equivalent to the matrix C in Dent. Dent's solution to the noninvertible matrix is to manage the channel assignments to avoid mutual interference resulting in an uninvertible matrix. This is accomplished in Dent in one embodiment with an adaptive assignment algorithm and in another embodiment with a managed assignment using reuse partitioning. In both embodiments 100% reuse is not achieved with random user geographical locations. In this invention the assignments are random and therefore require no management control or mutual interference computations. The mutual interference produced with singular or nearly singular matrix A'A is overcome by hopping assignments and using interleaving and error correction coding so that 100% reuse is realized.

It is understood that the use of additional equalizer weights in a tapped-delay-line filter configuration could be used to compensate for multipath distortion or to cancel previously detected interference as described in *MMSE Equalization*, referenced above. For this extended weight example, the direct solution by solving a matrix/vector equation such as (1), above, is accomplished by extending the matrix and vector definitions to include the additional weights.

The combined signal is then provided to a data group demultiplexer 29, which removes the reference data, e.g., reference data 1, from the combined signal. The data group demultiplexer 29 provides the combined signal without the reference data to a deinterleaver 30, which reverses the interleaving of the coded data performed by the interleaver 21. Finally, the deinterleaver 30 provides the deinterleaved data to a decoder 31, which performs error-correction decoding, thereby producing a digital output that is representative of the transmitted digital message information. Subsequent processing, e.g., digital-to-analog conversion (not shown), of the digital output may be required to obtain analog message information, e.g., voice signals, of the particular user.

While embodiments have been shown and described in accordance with the present invention, it is understood that the same is not limited thereto but is susceptible to numerous changes and modifications as known to a person skilled in this art. Accordingly, the present invention should not be limited to the detail shown and described herein but is intended to cover all such changes and modifications as are obvious to one of ordinary skill in this art.

Therefore, the present invention should be limited only by the spirit and scope of the appended claims.

What is claimed is:

1. A method of communicating digital data information from a plurality of user terminal transmitters located in a plurality of antenna beam coverage regions to a receiver with a multibeam antenna, wherein each user terminal transmitter is associated with a beam coverage region, comprising the steps of:

assigning with a random selection a plurality of multiple access channels that belong to a mutually orthogonal set to the plurality of user terminal transmitters within an antenna beam coverage region, and reusing the same multiple access channels with random assignments in adjacent beam coverage regions, and each multiple access channel is associated with a reuse factor, which is defined by the number of user terminal transmitter assignments in different beam coverage regions divided by the total number of beam coverage regions, and at least one multiple access channel is reused in all beam coverage regions so that its reuse factor is unity;

adding, at the user terminal transmitter, error-correction coding to the digital data information to provide coded information;

interleaving, at the user terminal transmitter, the coded information among a plurality of data groups;

inserting in time to each data group, at the user terminal transmitter, a reference signal associated with the beam coverage region of the user terminal transmitter to provide a multiplexed signal;

modulating, at the user terminal transmitter, the multiplexed signal with a multiple access waveform associated with the assigned multiple access channel to provide a multiple access signal;

transmitting, at the user terminal transmitter, the multiple access signal;

receiving, at the multibeam antenna of the receiver, the multiple access signals from the plurality of user terminal transmitters so as to provide a plurality of antenna beam signals;

combining, at the receiver, the antenna beam signals to provide a combined signal associated with a user terminal transmitter, thereby reducing interference from user terminal transmitters assigned to different beam coverage regions;

deinterleaving and decoding, at the receiver, the combined signal to recover the user terminal transmitter digital data information, and wherein the assigning step further includes different selections for successive data groups.

2. The method of claim 1 wherein the combining step further includes:

generating a user-identifying replica of the reference signal associated with a user terminal transmitter.

3. The method of claim 2 wherein the combining step further includes:

subtracting the user-identifying replica from the combined signal to provide an error signal;
minimizing the mean square value of the error signal.

4. The method of claim 2 wherein the combining step further includes:

producing a plurality of user-identifying replicas;
correlating combinations of user-identifying replicas with antenna beam signals to provide a plurality of user/beam cross-channel values;
calculating the inner product of cross-channel values and antenna beam signals to provide a plurality of matched antenna beam signals,
converting cross-channel values into equalizer weights;
summing the product of equalizer weights and matched antenna beam signals, thereby producing the combined signal.

5. The method of claim 4 wherein the converting step further includes:

solving a set of simultaneous equations with a Cholskey decomposition.

6. A communication system for communicating digital data information from a plurality of user terminal transmitters located in a plurality of antenna beam coverage regions to a multibeam antenna in a receiver at a central node, wherein each user terminal transmitter is associated with a beam coverage region, comprising:

assignment controller, associated with the central node, for assigning with a random selection a plurality of multiple access channels that belong to a mutually orthogonal set to a plurality of user terminal transmitters in a beam coverage region, and for reusing the same multiple access channels with random assignments in adjacent beam coverage regions, and each multiple access channel is associated with a reuse factor, which is defined by the number of user terminal transmitter assignments in different beam coverage regions divided by the total number of beam coverage regions, and at least one multiple access channel is reused in all beam coverage regions so that its reuse factor is unity; and user terminal transmitter, disposed at the user terminal, for transmitting digital data information in a multiple access signal to the receiver comprising:

means for adding error-correction coding to the digital data information to provide coded information, and
means for interleaving the coded information among a plurality of data groups, and
means for inserting in time to each data group a reference signal associated with the beam coverage region of the user terminal transmitter to provide a multiplexed signal, and
modulation means for modulating the multiplexed signal with a multiple access waveform associated with the assigned multiple access channel to provide a multiple access signal; and receiver, disposed at the central node, for receiving at the multibeam antenna the multiple access signals from the plurality of user terminal transmitters so as to provide a plurality of antenna beam signals, comprising:

summation means for combining the antenna beam signals to provide a combined signal associated with a user terminal transmitter, thereby reducing interference from user terminal transmitters assigned to different beam coverage regions, and means for deinterleaving and decoding the combined signal to recover the user terminal transmitter digital data information, and wherein the assignment controller further includes means for changing the selection for successive data groups.

7. A communication system according to claim 6 wherein the summation means further includes:
   means for generating a user-identifying replica of the reference signal associated with a user terminal transmitter.

8. A communication system according to claim 6 wherein the summation means further includes:
   means for subtracting the user-identifying replica from the combined signal to provide an error signal, and
   means for minimizing the mean square value of the error signal.

9. A communication system according to claim 6 wherein the summation means further includes:
   means for producing a plurality of user-identifying replicas, and
   means for correlating combinations of user-identifying replicas with antenna beam signals to provide a plurality of user/beam cross-channel values, and
   means for calculating the inner product of cross-channel values and antenna beam signals to provide a plurality of matched antenna beam signals, and
   conversion means for converting cross-channel values into equalizer weights, and
   means for summing the product of equalizer weights and matched antenna beam signals, thereby producing the combined signal.

10. A communication system according to claim 9 wherein the conversion means further includes:
    means for solving a set of simultaneous equations with a Cholskey decomposition.

* * * * *